United States Patent
Yamazaki

(10) Patent No.: US 7,024,047 B2
(45) Date of Patent: Apr. 4, 2006

(54) APPARATUS, METHOD, AND COMPUTER PROGRAM PRODUCT FOR IMAGE PROCESSING

(75) Inventor: Tsutomu Yamazaki, Sagamihara (JP)

(73) Assignee: Minolta Co., Ltd., Osaka (JP)

( * ) Notice: Subject to any disclaimer, the term of this patent is extended or adjusted under 35 U.S.C. 154(b) by 92 days.

(21) Appl. No.: 09/557,151

(22) Filed: Apr. 25, 2000

(65) Prior Publication Data

US 2003/0194147 A1    Oct. 16, 2003

(30) Foreign Application Priority Data

Apr. 26, 1999    (JP) .................................. 11-118578

(51) Int. Cl.
    *G06K 9/36*    (2006.01)
(52) U.S. Cl. .................... 382/242; 382/239; 382/266
(58) Field of Classification Search ................ 382/239, 382/249, 266, 242; 345/506; 358/1.9, 448; 341/50; 355/77

See application file for complete search history.

(56) References Cited

U.S. PATENT DOCUMENTS

| | | | |
|---|---|---|---|
| 4,853,752 A | * | 8/1989 | Takahashi et al. ............. 355/77 |
| 5,189,528 A | * | 2/1993 | Takashima et al. ......... 358/448 |
| 5,757,972 A | * | 5/1998 | Murayama .................. 382/242 |
| 5,774,077 A | * | 6/1998 | Schouhamer Immink .... 341/50 |
| 5,862,264 A | * | 1/1999 | Ishikawa et al. ............ 382/249 |
| 6,373,992 B1 | * | 4/2002 | Nagao ......................... 382/266 |

FOREIGN PATENT DOCUMENTS

| | | | |
|---|---|---|---|
| EP | 0 758 186 A2 | | 2/1997 |
| JP | 3-276966 A | | 12/1991 |
| JP | 404134340 A | * | 5/1992 |
| JP | 4-248766 A | | 9/1992 |
| JP | 4-311195 A | | 11/1992 |
| JP | 05-145768 A | | 6/1993 |
| JP | 05-294018 A | | 11/1993 |
| JP | 7-95578 A | | 4/1995 |
| JP | 9-107549 | | 2/1997 |
| JP | 9-98421 | | 4/1997 |
| JP | 9-98421 A | | 4/1997 |
| JP | 9-130797 | | 5/1997 |
| JP | 9-224246 | | 8/1997 |
| JP | 10-42294 A | | 2/1998 |

* cited by examiner

*Primary Examiner*—Anh Hong Do
(74) *Attorney, Agent, or Firm*—Sidley Austin LLP

(57) ABSTRACT

An apparatus for image processing including a region detector, a density conversion unit, a compression unit, and an expansion unit. The region detector detects an edge region in an image data. The density conversion unit reduces a density difference within the edge region detected by the region detector. The compression unit compresses the image data within the edge region where the density difference is reduced by the density conversion unit, using the discrete cosine transform. The expansion unit expands the image data compressed by the compression unit.

15 Claims, 7 Drawing Sheets

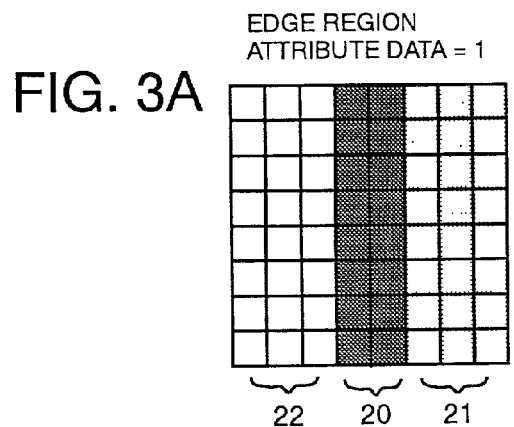
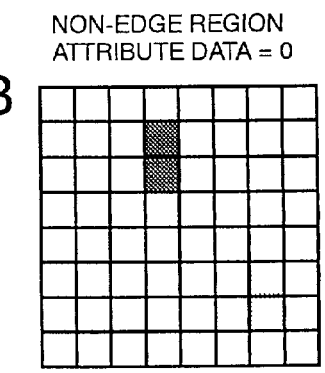
FIG. 3A — EDGE REGION ATTRIBUTE DATA = 1
FIG. 3B — NON-EDGE REGION ATTRIBUTE DATA = 0
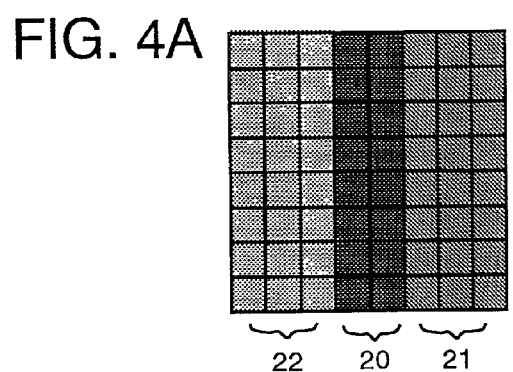
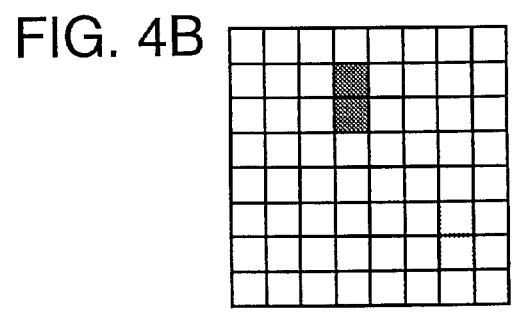
FIG. 4A
FIG. 4B
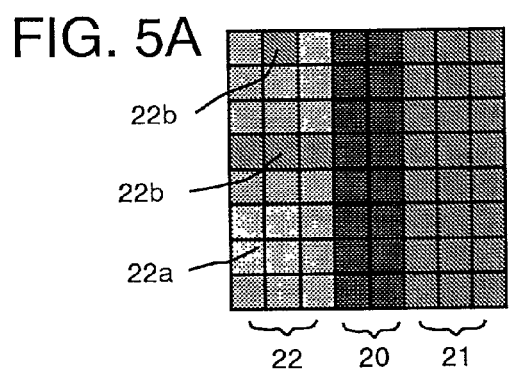
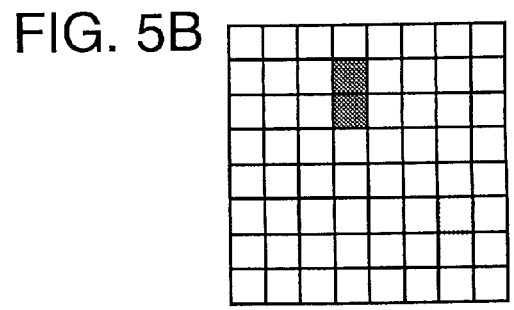
FIG. 5A
FIG. 5B
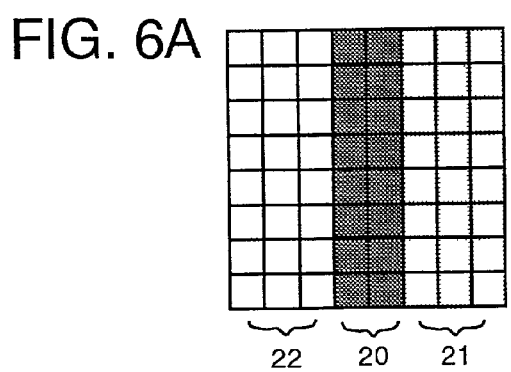
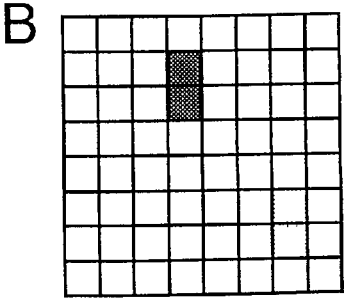
FIG. 6A
FIG. 6B

APPARATUS, METHOD, AND COMPUTER PROGRAM PRODUCT FOR IMAGE PROCESSING

This application is based on Japanese Patent Application No. 11-118578 filed on Apr. 26, 1999, the contents of which are hereby incorporated by reference.

BACKGROUND OF THE INVENTION

1. Field of the Invention

The present invention relates to the compression and expansion process of an image data using the discrete cosine transform technique, in particular, relative to the reduction of the mosquito noise.

2. Description of Related Art

The JPEG (Joint Photographic Experts Group) method based on the discrete cosine transform is widely used as a means of compressing and expanding the image data. Image processing devices such as copying machines, scanners and printers apply the compression and expansion process to the image data in order to reduce the capacity requirement of the memory used for storing the image data. However, the compression and expansion process using the discrete cosine transform tends to generate mosquito noises which deteriorate the image quality in the vicinity of edges where the density values of pixels change sharply.

Publication of Unexamined Japanese Patent Application JP-A-5-294018 discloses a technique of removing mosquito noises. The technique removes the noises by, after compressing an image data, correcting an image data in an edge region during the expansion of the compressed image data.

The technology disclosed in the above publication is a technology of allowing the generation of the mosquito noises during the compression of the image data containing the edge region using the JPEG method, and removing the noises by another process later.

However, if the mosquito noises are too large, the process of correcting the image data in the edge region by treating the image data with the density value below a specified value as noises may inadvertently delete a part of the original image together with the mosquito noises. Therefore, it is necessary to reduce the generation of the mosquito noises themselves in order to remove the mosquito noises without losing part of the original image.

SUMMARY OF THE INVENTION

It is an object of the present invention to reduce the generation of the mosquito noises in an apparatus, a method, and a computer program product for image processing using the image compression based on the discrete cosine transform. This object is achieved by providing the following apparatus, method, and computer program product.

The apparatus for image processing including a region detector for detecting an edge region in an image data, a density conversion unit for reducing a density difference within the edge region detected by the region detector, a compression unit for compressing the image data within the edge region where the density difference is reduced by the density conversion unit, using discrete cosine transform, and an expansion unit for expanding the image data compressed by the compression unit.

The method for image processing including the steps of detecting an edge region within an image data, reducing a density difference within the edge region, compressing the image data within the edge region where the density difference is reduced, using discrete cosine transform, and expanding the compressed image data.

The computer program product for image processing including the steps of detecting an edge region within an image data, reducing a density difference within the edge region, compressing the image data within the edge region where the density difference is reduced, using the discrete cosine transform, and expanding the compressed image data.

The objects, characteristics, and advantages of this invention other than those set forth above will become apparent from the following detailed description of the preferred embodiments, which refers to the annexed drawings.

BRIEF DESCRIPTION OF THE DRAWINGS

FIG. 3A and FIG. 3B show examples of input image data for a density conversion unit of the image processing unit;

FIG. 4A and FIG. 4B show output image data of the density conversion unit that correspond to the image data shown in FIG. 3A and FIG. 3B;

FIG. 5A and FIG. 5B show input image data for a density restoring unit of the image processing unit that correspond to the image data shown in FIG. 4A and FIG. 4B;

FIG. 6A and FIG. 6B show output image data of the density restoring unit that correspond to the image data shown in FIG. 5A and FIG. 5B;

DETAILED DESCRIPTION OF THE EMBODIMENTS

The embodiments of this invention will be described below with reference to the accompanying drawings.

Figure 1:
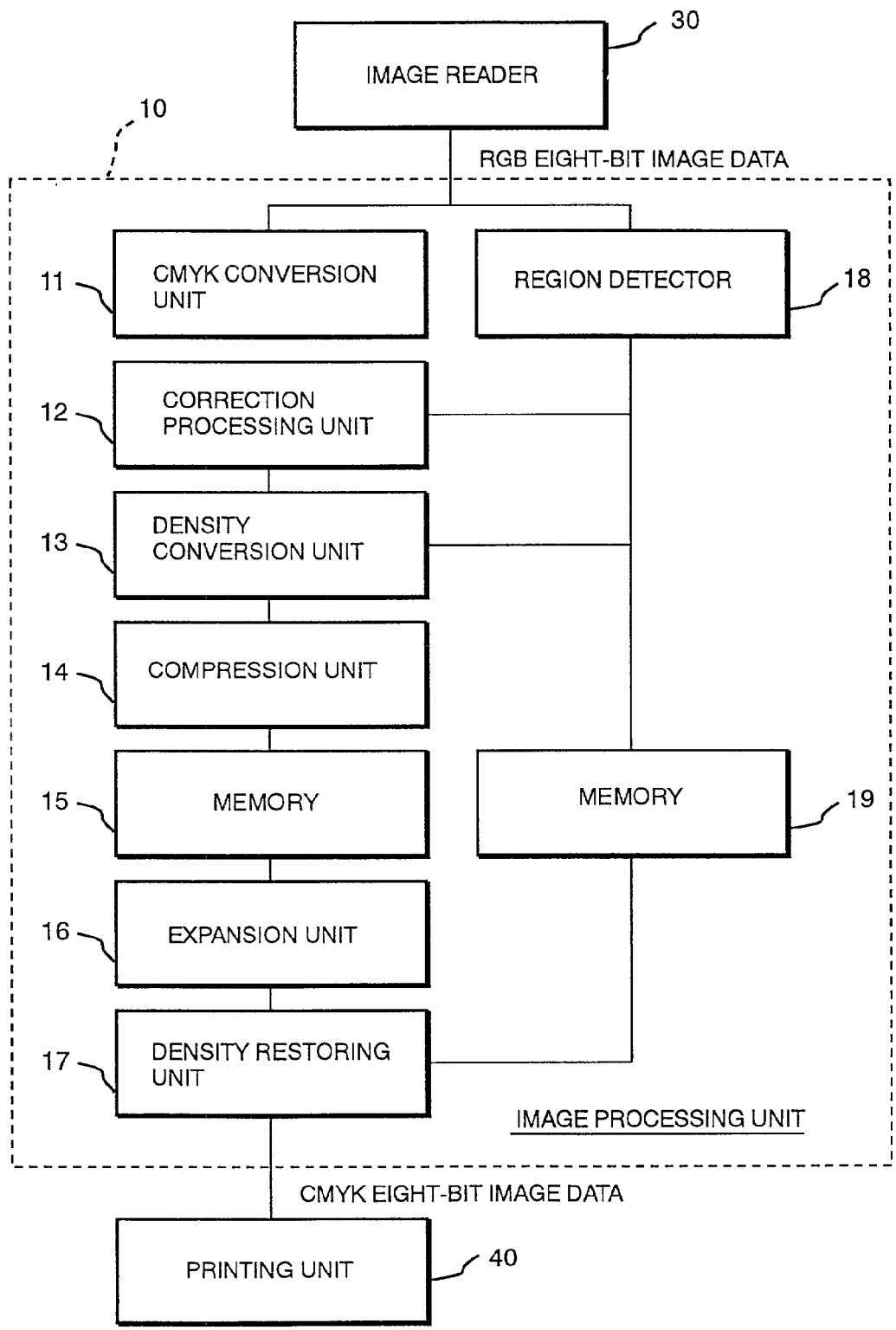
FIG. 1 is a block diagram of a digital copying machine according to an embodiment of the present invention.

An image processing unit 10 shown in FIG. 1 as an embodiment of this invention is incorporated in a digital copying machine. The digital copying machine has an image reader 30 and a printing unit 40. The image reader 30 reads the document image to generate RGB eight-bit image data. The image processing unit 10 applies various processes to the image data to generate CMYK eight-bit image data. The printing unit 40 prints the output data on papers. The symbols R, G, B, C, M, Y and K stand for red, green, blue, cyan, magenta, yellow and black, respectively. Eight-bit image data is data that contains each color component's density value expressed by an eight-bit signal per pixel. The image processing unit 10 consists of a CMYK conversion unit 11, a correction processing unit 12, a density conversion unit 13, a compression unit 14, an expansion unit 16, a density restoring unit 17, a region detector 18, and memories 15, 19. Since the basic control circuit and the mechanical constitution of the digital copying machine are identical those of the conventional machine, their descriptions are not repeated here.

Now, the outline of the operation of the image processing unit 10 is described along the flow of the image data.

First of all, the RGB eight-bit image data from the image reader 30 is inputted into the CMYK conversion unit 11 and the region detector 18.

The CMYK conversion unit 11 applies the UCR (under color removal) process, the color system conversion process, etc., to the RGB eight-bit image data to generate CMYK eight-bit image data. The CMYK eight-bit image data is inputted into the correction processing unit 12. Since the CMYK conversion unit 11 is similar to the conventional unit, detail descriptions are not repeated here.

The region detector 18 divides the RGB eight-bit image data into a plurality of areas and detects which of the two regions, an edge region and a non-edge region, each area belongs to. The edge region is where many edges of characters and fine lines exist. The non-edge region is an area other than the edge region and contains a halftone dot region where halftone dots exist. The detection result is inputted into the correction processing unit 12 and the density conversion unit 13 and is stored into the memory 19.

The correction processing unit 12 applies the edge enhancement correction to the image data of the edge region based on the detection result of the region detector 18, and applies the smoothing correction to the image data of the halftone dot region. The corrected image data is inputted into the density conversion unit 13.

The density conversion unit 13 executes to the image data of the edge region the density conversion process that converts the eight-bit image data into seven-bit image data based on the detection result of the region detector 18. Seven-bit image data is image data expressed in seven-bit signals per each pixel. Seven-bit image data of the edge region and eight-bit image data of the non-edge region are inputted into the compression unit 14. The compression unit 14 compresses the image data, based on the JPEG method using the discrete cosign transform. The compressed image data is stored into the memory 15.

The expansion unit 16 reads the image data from the memory 15 when the image data is to be used, and applies the expansion process to the image data.

The density restoring unit 17 executes the density restoring process that converts seven-bit image data of the edge region into the eight-bit image data based on the detection result of the region detector 18 stored in the memory 15 and outputs the converted data of edge region to the printing unit 40 together with the eight-bit image data of non-edge region. The CYMK eight-bit image data is printed on a paper using the printing unit 40.

Now, the process of the region detector 18 is described in detail.

The vicinities of the edges of characters and fine lines contained in an edge region have large density differences. Therefore, the compression and expansion process using the discrete cosine transform may generate a large amount of mosquito noises. In the present embodiment, the eight-bit image data of the edge region detected by the region detector 18 is converted into the seven-bit image data prior to the compression process in order to reduce the density differences.

Figure 2:
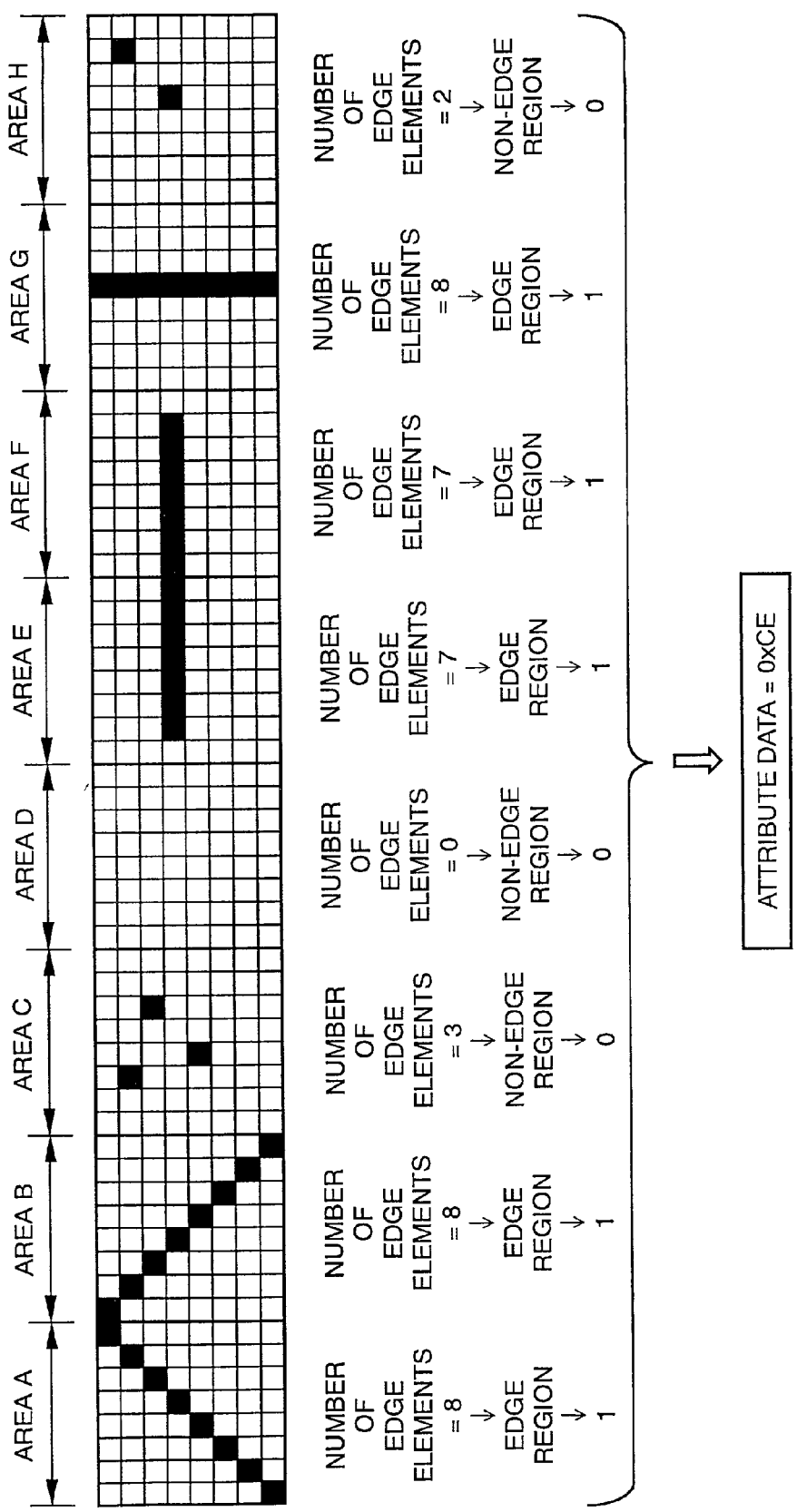
FIG. 2 is a diagram of assistance in explaining the detection of edge regions by means of a region detector of an image processing unit of the digital copying machine.

The detection of the edge region by the region detector 18 is executed for the entire input image data. More specifically, the image data is first divided into a plurality of areas consisting of N pixels×N pixels. In case of FIG. 2, the eight areas A through H consist of eight pixels×eight pixels. An edge element is shown in black and the threshold value of the edge region is "5." In other words, an area with more than five edge elements is determined to belong to the edge region and the area containing five or less edge elements is determined to belong to the non-edge region.

For example, the area A includes eight edge elements, so that a signal "1" is outputted as the attribute data, while the area C includes three edge elements so that a signal "0" is outputted as the attribute data. The signals "1" and the "0" indicate that the areas belong to the edge region and the non-edge region respectively. The detection result of 1 bit which consists of either "1" or "0" is inputted into the correction processing unit 12 and the density conversion unit 13, and is stored into the memory 19. The entire areas A through H are detected whether each area belongs to either the edge region or the non-edge region. As a result, the attribute data for the target areas A through H becomes "11001110," or "0×CE" in the hexadecimal notation.

Next, the process of the density conversion unit 13 will be described below.

FIG. 3A and FIG. 3B show an image data of an edge region and an image data of a non-edge region respectively. The image data are the input image data for the density conversion unit 13. Incidentally, the density conversion process is not applied to the non-edge region.

The image data of the edge region consists of eight pixels×eight pixels. Also, the density of the image data is expressed in eight-bit data, and is classified into 256 steps ranging from 0x00 to 0xFF. The density of the first part 20, the second part 21 and the third part 22 shown in FIG. 3A are "0xA0," "0x30" and "0x00" respectively.

The density difference between the first part 20 and the second part 21 is "0x70" (=0xA0−0x30), and the density difference between the first part 20 and the third part 22 is "0xA0" (=0xA0−0x00).

FIG. 4A and FIG. 4B show the output image data of the density conversion unit 13.

The density conversion unit 13 converts the eight-bit image data of the edge region into the seven-bit image data based on the detection result of the region detector 18. More specifically, the density conversion unit 13 executes a process of reducing the imaged data into one half by dividing the image data by 2. In other words, the density conversion unit 13 reduces the density difference to one half by converting the N-bit image data into (N-1)-bit image data by means of a bit calculation suitable for computer processing.

The density value "0xA0" of the first part 20 is converted into "0x50" (=0xA0/2). The density value "0x30" of the second part 21 is converted into "0x18" (=0x30/2). The density value "0x00" of the third part 22 is converted into "0x00" (=0x00/2). The density difference between the first part 20 and the second part 21 becomes "0x38" (=0x50−0x18). The density difference is equal to one half of the density difference "0x70" before the density conversion process. The density difference between the first part 20 and the third part 22 is "0x50" (=0x50−0x00) and is one half of the density difference "0xA0" before the density conversion process. Thus, the density difference within the edge region is reduced.

The density of the image data is generally lighter due to the density conversion process. However, it is difficult to separate image data with light density from noises. The density conversion unit 13 is further treated with a raising process where a certain value is to be added to the image data after the density conversion process to make the density of the image data darker. In other words, the density conversion unit 13 makes the density of the (N-1)-bit image data dark by a certain amount to facilitate the separation of the image data from noises.

For example, using the top bit, "0x80" is added to the density values of the first part 20, the second part 21 and the third part 22. Therefore, the density value of the first part 20 is converted to "0xD0" (=0x50+0x80), the density value of the second part 21 is converted to "0x98" (=0x18+0x80), and the density value of the third part 22 is converted to "0x80" (=0x00+0x80). FIG. 4A shows the image data subjected to the conversion process.

The image data of the edge region with the reduced density difference and the image data of the non-edge region are compressed and stored into the memory 15.

Next, the process content of the density restoring unit 17 will be described below.

FIG. 5A and FIG. 5B are the image data where the compression process is applied and correspond to FIG. 4A and FIG. 4B. The image data are the input image data for the density restoring unit 17. Incidentally, the density restoring process is not applied to the non-edge region.

The density difference within the edge region becomes small since the image data of the edge region is converted into seven-bit image data before compression. The mosquito noise generation can be alleviated. However, mosquito noises can slightly occur in the area where the density is light, such as the third part 22. The third part 22 shown in FIG. 5A contains the elements 22a, 22b having a density value different from that of the original value "0x80" before the compression process is applied. The density of the elements 22a is lighter than the original density, e.g., "0x7F." The density of the elements 22b is darker than the original density, e.g., "0x81."

Therefore, the density restoring unit 17 executes a process of removing mosquito noises existing in the areas where the density is light. More specifically, a density value below a specified threshold value, e.g., "0x88," is considered to be "0x80," and converted to "0x00." The density value "0x80" corresponds to "0x00" before the density conversion process.

In addition, the density restoring unit 17 returns the image data with density values higher than the specified threshold value to eight-bit image data. Specifically, the values obtained by subtracting a certain value, e.g., "0x7F," from the density values of the image data are multiplied by 2. The density restoring process is equivalent to the reverse operation of the density conversion process. FIG. 6A and FIG. 6B are the output image data of the density restoring unit 17.

The density of the non-edge region do not change despite the density conversion unit 13 and the density restoring unit 17 as can be seen from FIG. 3B, FIG. 4B, FIG. 5B and FIG. 6B.

Figure 7:
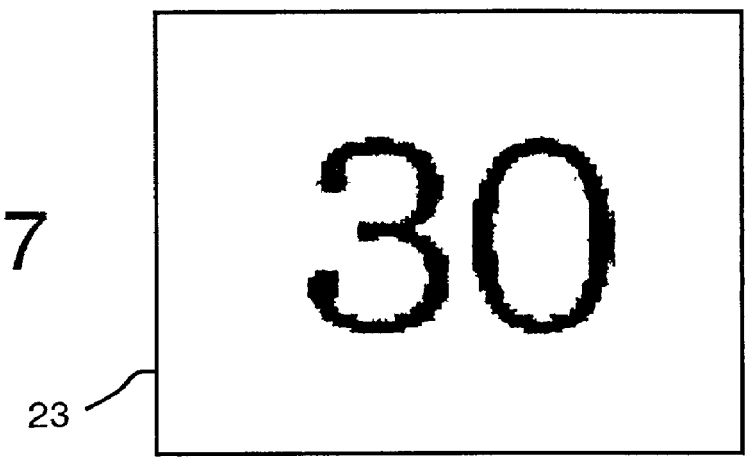
FIG. 7 is an example of an input image data for the image processing unit.
Figure 8A:
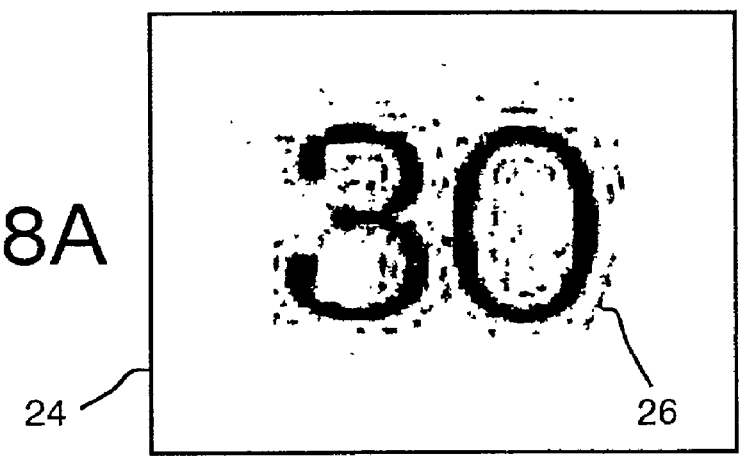
FIG. 8A and FIG. 8B show output image data of a conventional digital copying machine and the digital copying machine according to the present invention that correspond to the image data shown in FIG. 7.
Figure 8B:
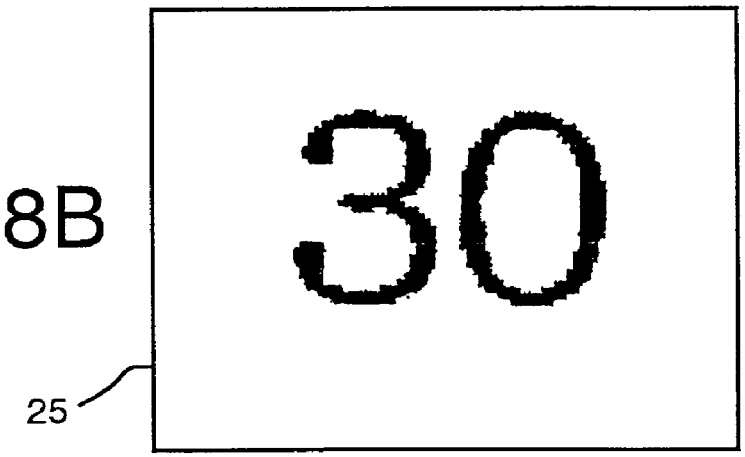

FIG. 8A shows the output image 24 of the conventional image processing apparatus based on the input image 23 shown in FIG. 7. The output image 24 contains the mosquito noises 26. FIG. 8B show the output image 25 of the image processing unit 10 of the digital copying machine according to the present embodiment based on the same image 23. The output image 25 contains no mosquito noise. In other words, although the mosquito noises 26 appear around the edges of characters and fine lines in the prior art, no mosquito noise occur in the present embodiment.

Figure 9A:
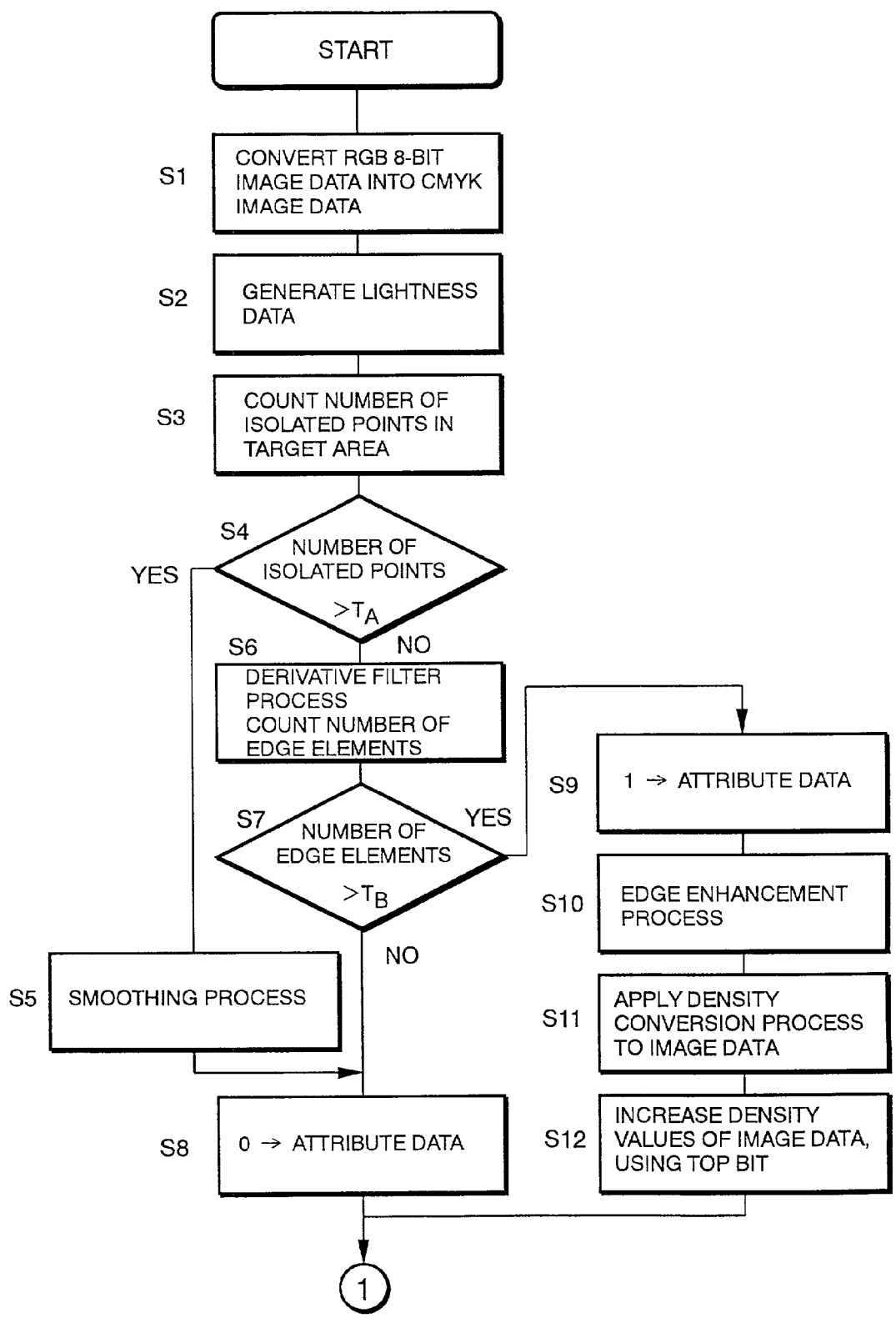
FIG. 9A and FIG. 9B show an operation flow chart of the image processing unit.
Figure 9B:
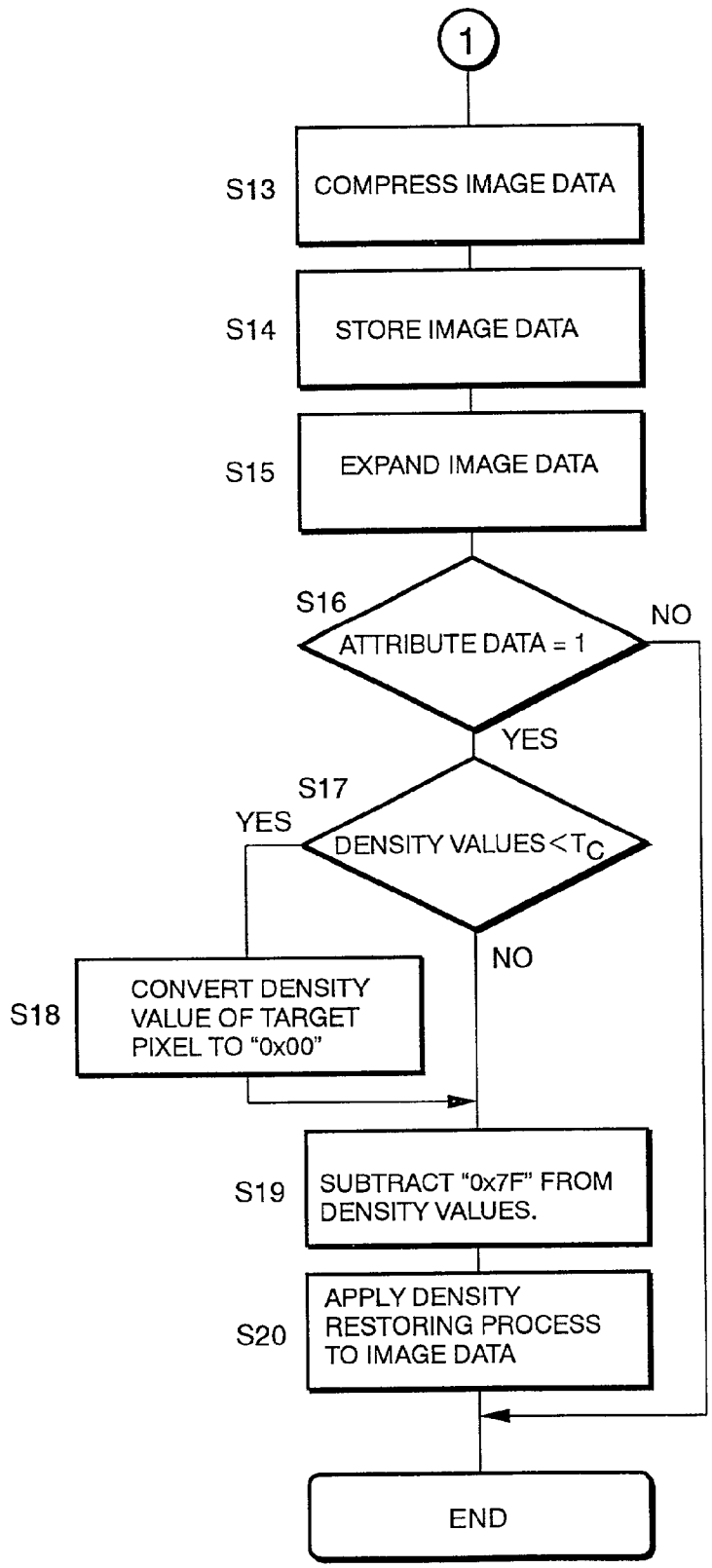

Next, the operation of the image processing unit 10 will be described referencing the flow chart of FIG. 9A and FIG. 9B.

The RGB eight-bit image data from the image reader 30 is converted into CMYK eight-bit image data at the CMYK conversion unit 11 (step S1).

At the region detector 18 the HVC conversion of the CMYK eight-bit image data is first executed to generate the lightness data (step S2). Next, isolated points are detected based on the lightness data, and the number of isolated points is counted in a target area surrounding the target pixel (step S3). Next, it is determined whether the number of isolated points is larger than a threshold value $T_A$ (step S4).

If the number of isolated points is determined to be larger than the threshold value $T_A$, the target area belongs to the halftone dot region, so that the smoothing process is applied (step S5), and the process advances to the step S8.

On the other hand, if the number of isolated points is equal to or smaller than the threshold value $T_A$, the number of edge elements is counted (step S6). More specifically, the derivative filter process is applied to the lightness data. If the output of the derivative filter process is greater than a specified value, the target pixel is determined to be an edge element. The number of pixels which are edge elements are counted within the target area of N pixels×N pixels surrounding the target pixel.

Next, it is judged whether the number of edge elements is larger than a threshold value $T_B$ (step S7).

If the edge element count is judged to be equal to or smaller than the threshold value $T_B$, the process advances to the step S8.

At the step 8, a signal "0" is inputted into the memory 19 as the attribute data since the target area belongs to the non-edge region. Next, the process advances to the step S13 of FIG. 9B.

If the edge element count is judged to be larger than the threshold value $T_B$, the target area belongs to the edge region, so that the signal "1" is inputted into the memory 19 as the attribute data (step S9).

Next, the correction processing unit 12 applies the edge enhancement process to the edge region (step S10).

At the density conversion unit 13 an appropriate process is applied to the target area based on the attribute data stored in the memory 19 (step S1). More specifically, when the attribute data stored in the memory 19 is "1," the target area is judged to belong to the edge region, so that the density conversion process is applied to the image data within the target area to reduce the density difference. On the other hand, if the attribute data is "0," the target area is determined to the non-edge region, so that the density conversion process is not applied to the image data within the target area.

Next, the raising process is applied to the image data after the density conversion process adding a certain value using the top bit to make the density of the image data dark (step S12). This is to make it easier to separate the image data from noises. The process advances to the step S13 of FIG. 9B.

At step S13 the image data of the target area is compressed. Next, the compressed image data is stored into the memory 15 (step S14). The expansion unit 16 reads the image data from the memory 15 when the image data is to be actually used, and the expansion process is applied to the image data (step S15).

Next, it is determined whether the attribute data stored in the memory 19 is "1" or not (step S16). If the attribute data is judged to be "0," the target area is a non-edge region, and the process terminates as the density conversion process is not going to be applied.

If the attribute data is judged to be "1," it is further judge whether the density values of the pixels of the target area are smaller than a threshold value $T_C$ or not (step S17). If the density value of the target pixel is judged equal to or larger than the threshold value $T_C$, the process advances to the step S19.

If the density value of the target pixel is judged to be smaller than the threshold value $T_C$, the density value of the target pixel is converted to "0x00" (step S18). Thus, mosquito noises of a light degree in the area with light density are removed. Next, the process advances to the step S19.

At step S19, a certain value, e.g., "0x7F," is subtracted from the density values larger than the threshold value $T_C$. Next, the density restoring process is applied to the image data (step S20). Specifically, by multiplying the values thus obtained by 2, the image data of the target area that belongs to the edge region is returned to eight-bit image data.

As can be seen from the above, the compression process is applied to the image data having reduced density differences within the edge region. Thus, it is possible to alleviate the generation of mosquito noises and to prevent some portions of the necessary image from being removed.

It is obvious that this invention is not limited to the particular embodiments shown and described above but may be variously changed and modified without departing from the technical concept of this invention.

Although eight-bit image data is suggested to be the subject in this embodiment, the technique can be applied to N-bit image data. In such a case, the density difference within an edge region can be reduced by converting N-bit image data to (N-1)-bit image data. Moreover, the process of converting N-bit image data to (N-i)-bit image data can be used as a process of reducing the density difference within an edge region. However, the number i must be a number smaller than the number N.

It is also possible to reduce the density difference within an edge region by means of subtracting a certain value from a density value larger than a threshold value $T_D$. Also, it is possible to reduce the density difference within an edge region by means of adding a certain value to a density value smaller than a threshold value $T_E$. Moreover, it is also possible to reduce the density difference within an edge region by means of subtracting a certain value from a density value larger than the threshold value $T_D$, and simultaneously adding a certain value to a density value smaller than the threshold value $T_E$.

Furthermore, although an image processing unit incorporated in a digital copying machine is described in the above as an example of the embodiment, the present invention can be applied an image processing unit incorporated in an image reading apparatus such as a scanner that reads documents or an image forming apparatus such as a printer that prints image data on papers.

Figure 10:
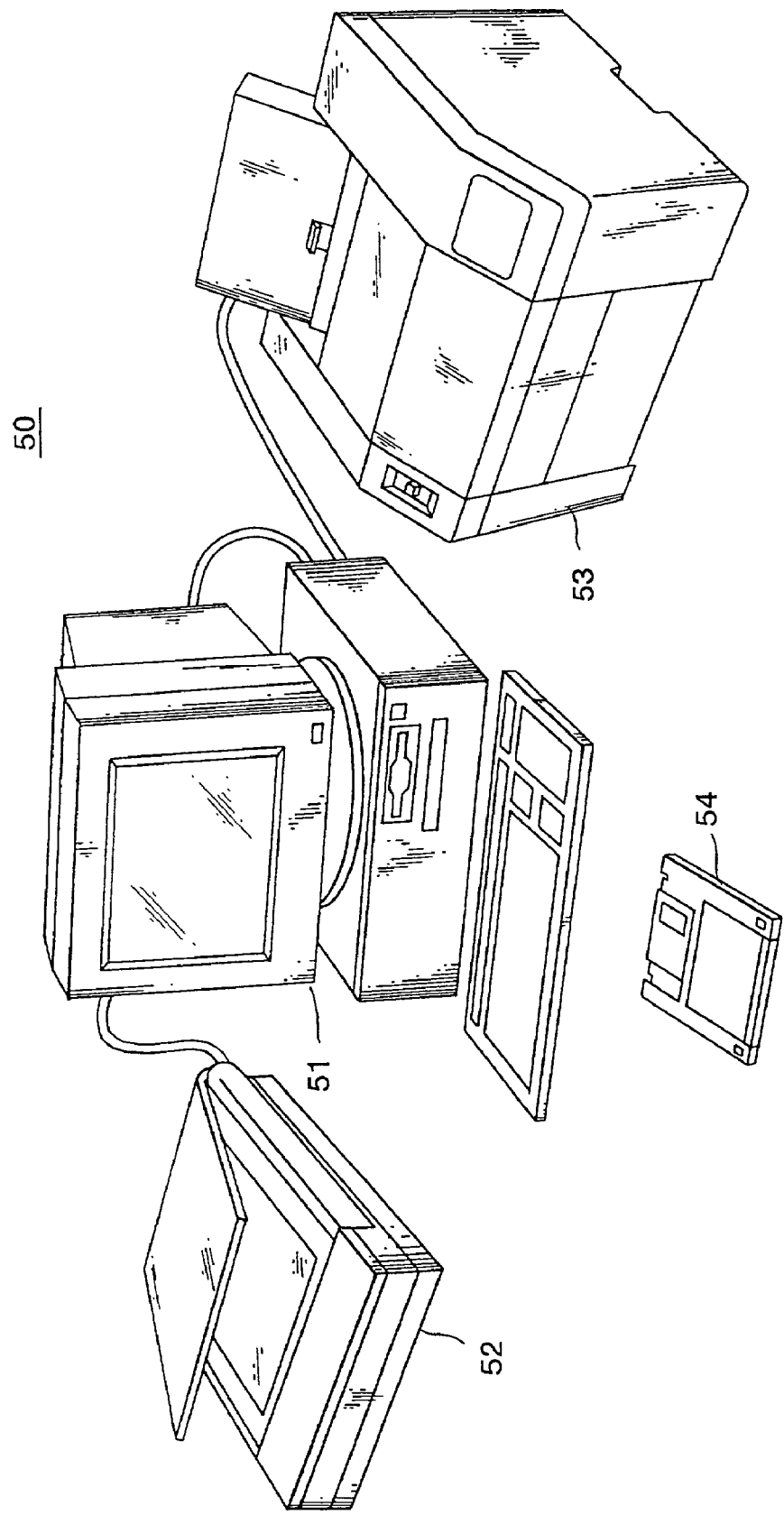
FIG. 10 is a perspective view of the image processing system of another embodiment of the present invention.

It is also applicable to computers such as a personal computer by providing a computer program product having a program corresponding to the operational procedures of the image processing unit. The computer program product includes a storage medium where the program is stored. A specific example is an image processing system 50 shown in FIG. 10. The image processing system 50 consists of an image reading apparatus 52, an image forming apparatus 53 and a computer 51. The computer 51 functions as an image processing unit based on a program provided by a floppy disk 54, which is the computer program product. Accordingly, the computer 51 applies a certain image processing to an image data from the image reading apparatus 52 and outputs the data thus obtained to the image forming apparatus 53.

What is claimed is:

1. An apparatus for image processing comprising:
    a region detector for detecting an edge region in an image data;
    a density conversion unit for reducing a density difference within the edge region detected by said region detector;
    a compression unit for compressing the image data within the edge region where the density difference is reduced by said density conversion unit, using discrete cosine transform; and
    an expansion unit for expanding the image data compressed by said compression unit.

2. An apparatus as claimed in claim 1, wherein said density conversion unit converts N-bit image data into (N-1)-bit image data.

3. An apparatus as claimed in claim 2, wherein said density conversion unit increases a density value of the converted (N-1)-bit image data a certain amount.

4. An apparatus as claimed in claim 1, further comprising an image reader for reading a document wherein said image data is an image data outputted by said image reader.

5. An apparatus as claimed in claim 1, further comprising a printing unit for printing an image data on a paper wherein said image data is the image data expanded by said expansion unit.

6. A method for image processing comprising the steps of:
    detecting an edge region within an image data;
    reducing a density difference within the edge region;
    compressing the image data within the edge region where the density difference is reduced, using discrete cosine transform; and
    expanding the compressed image data.

7. A method as claimed in claim 6, wherein said step of reducing a density difference is a step of converting N-bit image data into (N-1)-bit image data.

8. A method as claimed in claim 7, wherein said step of reducing a density difference includes a step of increasing a density value of the (N-1)-bit image data by a certain amount.

9. A method as claimed in claim 6, further comprising a step of reading a document and generating an image data to be processed.

10. A method as claimed in claim 6, further comprising a step of printing the expanded image data on a paper.

11. A computer program product for image processing in a computer readable medium, the computer program product including instructions to execute the following procedures:
    a step of detecting an edge region within an image data;
    a step of reducing a density difference within the edge region;
    a step of compressing the image data within the edge region where the density difference is reduced, using discrete cosine transform; and
    a step of expanding the compressed image data.

12. A computer program product as claimed in claim 11, wherein said step of reducing a density difference is a step of converting N-bit image data into (N-1)-bit image data.

13. A computer program product as claimed in claim 12, wherein said step of reducing a density difference includes a step of increasing a density value of the (N-1)-bit image data by a certain amount.

14. A computer program product as claimed in claim 11, further comprising a step of reading a document and generating an image data to be processed.

15. A computer program product as claimed in claim 11, further comprising a step of printing the expanded image data on a paper.

* * * * *